United States Patent [19]
Masuda et al.

[11] Patent Number: 5,371,605
[45] Date of Patent: Dec. 6, 1994

[54] METHOD AND APPARATUS FOR RECORDING AND REPRODUCING A TIME-VARYING IMAGE USING OPTICAL DISK

[75] Inventors: Wataru Masuda; Hironori Masuda, both of Hirakata; Takafumi Sugano, Katano, all of Japan

[73] Assignee: Matsushita Electric Industrial Co., Ltd., Osaka, Japan

[21] Appl. No.: 104,937

[22] Filed: Aug. 12, 1993

Related U.S. Application Data

[63] Continuation of Ser. No. 796,304, Nov. 22, 1991, abandoned.

[30] Foreign Application Priority Data

Nov. 22, 1990 [JP] Japan .................. 2-318577

[51] Int. Cl.[5] ............................................. H04N 5/76
[52] U.S. Cl. ........................................ 358/342; 358/346
[58] Field of Search ................ 358/311, 346, 342; 360/14.1, 14.2, 14.3, 13, 72.2; 369/59, 72, 47, 118, 83

[56] References Cited

U.S. PATENT DOCUMENTS

| | | | |
|---|---|---|---|
| 4,835,626 | 5/1989 | Wilkinson et al. | 360/14.3 |
| 4,837,638 | 6/1989 | Fullwood | 362/14.2 |
| 4,901,300 | 2/1990 | Van Der Zande et al. | 369/47 |
| 5,126,991 | 6/1992 | Verboom | 369/59 |
| 5,146,448 | 9/1992 | Adachi et al. | 369/83 |
| 5,195,068 | 3/1993 | Morishima | 369/32 |

OTHER PUBLICATIONS

Optical Memory Symposium '85 Treatises, issued Dec. 1985, by Hikari Sangyo Gijutsu Sinko Kyokai Foundation, pp. 177-180 and entitled "Off-Line Editing System Using Optical Memory Discs" by Wataru Masuda et al.

Latest Optical Disk System and its Applied Technology, issued Dec. 20, 1987 by Mimatsu Data System, pp. 128-131.

ITEJ Technical Report vol. 11, No. 31, pp. 69 & 74, OPT '87-20, issued Nov. 25, 1987 and entitled "The servo technology for the optical memory disc recorder (OMDR) and applications of OMDR" by Ryoichi Imanaka et al.

*Primary Examiner*—Tommy P. Chin
*Assistant Examiner*—Robert Chevalier
*Attorney, Agent, or Firm*—Wenderoth, Lind & Ponack

[57] ABSTRACT

A method and an apparatus having a memory device for recording a time-varying image in an optical information record medium having an address of a code track corresponding to the image and reproducing the image therefrom, includes the steps of storing data into the memory device of the relationship between the address of the code track and an address of a time code in correspondence with the image, inputting the address of the time code in correspondence with the image to be recorded or reproduced, converting the inputted address of the time code into the address of the code track based on the data stored in the storing step, and accessing to the medium based on the address of the code track obtained by the converting step to record or reproduce the image in correspondence with the inputted address of the time code.

19 Claims, 13 Drawing Sheets

| STEP | PLAYER | CUTIN | CUTOUT |
|------|--------|-------|--------|
| 1 | 3 | 500 | 1100 |
| 2 | 2 | 10000 | 13000 |
| 3 | 4 | 100 | 400 |

CUTIN and CUTOUT are expressed by track address.

METHOD AND APPARATUS FOR RECORDING AND REPRODUCING A TIME-VARYING IMAGE USING OPTICAL DISK

This application is a continuation of now abandoned application, Ser. No. 07/796,304, filed Nov. 22, 1991.

BACKGROUND OF THE INVENTION

The present invention relates to a method for recording and reproducing video information such as a time-varying image to be carried out by using an optical information recording medium, for example, an optical disk capable of carrying out recording, reproduction, and erasing. The present invention also relates to an optical information recording and reproducing apparatus such as an optical disk player or recorder to be used to carry out the method.

Conventionally, a video tape recorder has been used to edit images recorded on a video tape. But the VCR has no random access function and rise time is required and as such it is necessary to set a pre-roll period of time to images. Thus, it takes a very long time to edit images. In order to reproduce images recorded on the video tape by reproducing the same image repeatedly in an editing operation, a video tape becomes worn because the video tape travels in contact with a reproducing head.

In order to solve this disadvantage, instead of the VCR, an optical disk device having a random access function and a specific reproducing function such as a slow reproduction or a fast reproduction is used to edit images frame by frame or to simulate an edited result. According to this method, since an optical head does not contact an optical disk, the recording medium is not worn.

However, in editing images by means of the optical disk device, a track address recorded on the optical disk is used as the information for discriminating images from each other. Therefore, unlike a time code which is used as the information for discriminating images from each other in the VCR, an operator finds an editing operation by means of a VCR more difficult than an editing operation by means of the optical disk. That is, in a normal video editing operation, the operator memorizes the time code expressed by a "0 minute 0 second 01 frame" displayed in the image of the original tape in relation thereto and finds it easier to perform an editing operation based on the time code than based on the track address. Further, in order to keep a series of edited images under a certain period of time, it is necessary to detect the period of time which is spent by each scene during the editing operation. In editing images by means of the VCR, it is easy for the operator to detect the period of time which is spent by each scene because the time code attached to the image of the VCR is used as the information for discriminating images from each other. However, in editing an image by means of the optical disk, it is difficult for the operator to detect the period of time which is spent by each scene because the track address is used.

According to another method for editing images, a "1" address is fixed in a "0 minute 0 second 01 frame" by a fixed converting method and is converted into time indication of increasing frames by one frame for one track. According to this method, the relationship between a track address and an image information address remain fixed in a disk comprising a read-only memory. Therefore, no problems occur when the image information address is converted into the track address based on fixed information. But if this method is utilized by a disk of additional writing type or rewriting type in recording or reproducing image information, merely the conversion of the image information address into the track address will lead to a disadvantage. For example, if images of a plurality of video tapes are recorded on an optical disk or required images of a series of image information are selectively recorded on the optical disk according to the conventional method of editing time-varying images by means of the VCR, the time codes of images are discontinuous and as such, the relationship between the track address of the optical disk and the time code indicating recorded image information address becomes unconstant. Therefore, it is unknown which time code corresponds to which track address, which makes it difficult to edit images.

SUMMARY OF THE INVENTION

Accordingly, an object of the present invention is to provide a method for reproducing and recording a time-varying image in a short period of time and an optical disk player to be used to carry out the method.

In accomplishing these and other objects, according to one aspect of the present invention, there is provided an apparatus for recording a time-varying image in an optical information recording medium having an address of a code track corresponding to the image, and for reproducing the image therefrom, comprising:
- a memory means for storing data of the relationship between the address of the code track and an address of a time code in correspondence with the image;
- an input means for inputting the address of the time code in correspondence with the image to be recorded or reproduced;
- an address information conversion means for converting the inputted address of the time code into the address of the code track based on the data stored in the memory means; and
- an access means for accessing to the medium based on the address of the code track obtained by the conversion means to record or reproduce the image in correspondence with the inputted address of the time code.

According to another aspect of the present invention, there is provided a method for recording a time-varying image in an optical information record medium having an address of a code track corresponding to the image for reproducing the image therefrom, comprising the steps of:
- storing data of the relationship between the address of the code track and an address of a time code in correspondence with the image;
- inputting the address of the time code in correspondence with the image to be recorded or reproduced;
- converting the inputted address of the time code into the address of the code track based on the data stored in the storing step; and
- accessing to the medium based on the address of the code track obtained by the converting step to record or reproduce the image in correspondence with the inputted address of the time code.

According to the above construction, the track address of the optical disk and the image information address can be converted into each other. Therefore, even though the image information addresses are discontinuous, it is possible to reproduce the images recorded in the optical disk at high speed access by controlling the images by the track address attached to the code track. The reproducing operation can be carried out based on the image information address (time code), thus improving the operational performance of the reproducing operation.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1A:
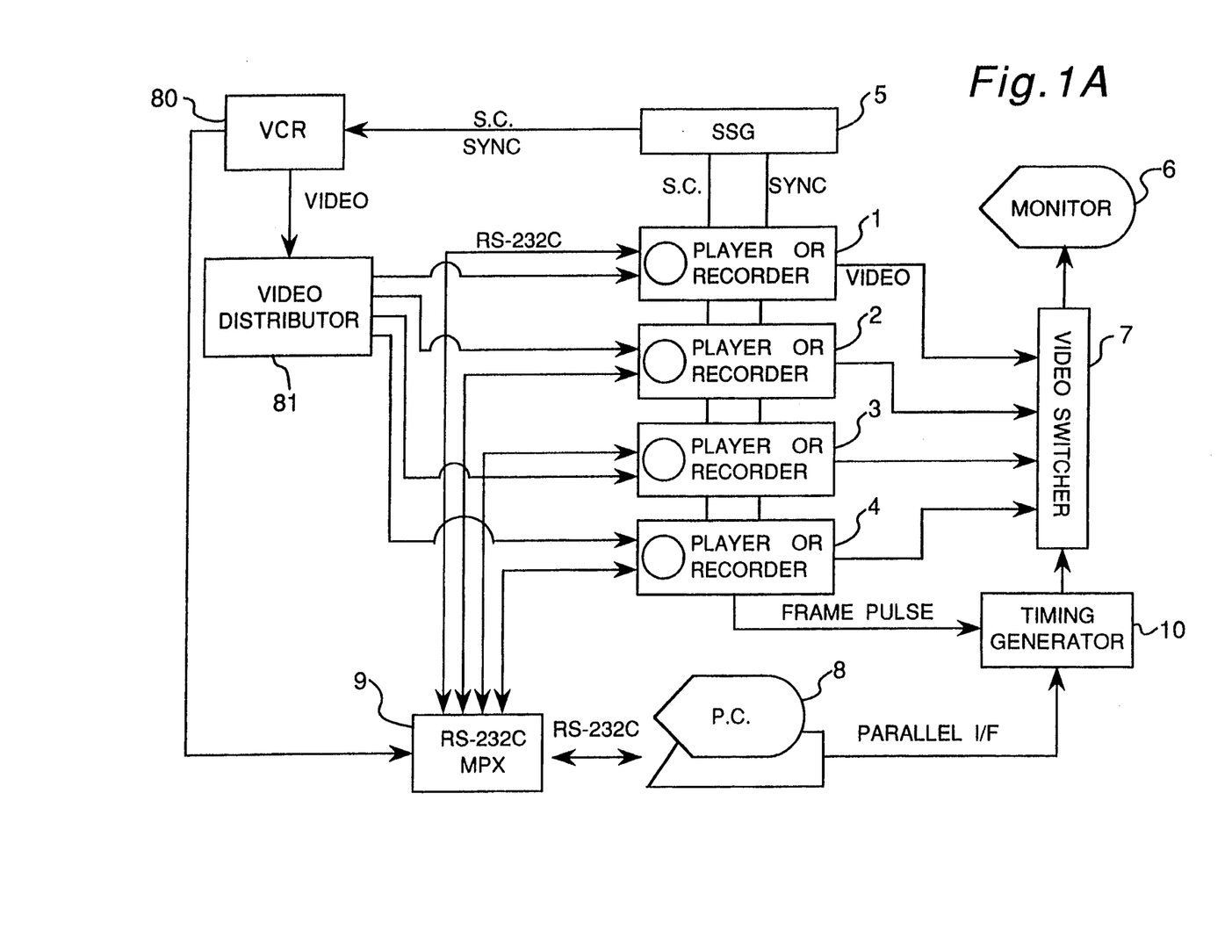
FIG. 1A is a block diagram showing the system of editing time-varying images to be carried out by means of an optical disk according to an embodiment of the present invention.

Referring now to the accompanied drawings, an embodiment of the present invention will be described below. FIG. 1A is a block diagram showing an editing system for carrying out a method for editing video information by using an optical disk according to an embodiment of the present invention.

Optical disk players 1 through 4 incorporate address information conversion means for converting a track address into an image information address or vice versa. The number of disk players is not limited to four although four disk players or recorders 1 through 4 are shown in FIG. 1A. A synchronizing signal generator (SSG) 5 generates signals outputted to the players 1 through 4 and a VCR 80. The generated signals are synchronizing signal and a subcarrier (S.C.), that is, a reference signal for choosing hue of an image signal. A monitor 6 displays images reproduced by the optical disk players 1 through 4 on its screen. A video switcher 7 is operatively connected to the disk players 1 through 4 and controlled by a personal computer (PC) 8 of an editing controller. The editing system further comprises an RS-232C interface 9 and a timing generator 10. A video distributor 81 is changed by a video signal from the VCR 80 so that the video signal of the VCR 80 is inputted to the optical disk player 1, 2, 3, or 4 to be recorded and an image information in the video signal is recorded in the optical disk of the player selected by the video distributor 81.

In each of the optical disk players 1 through 4 on which images to be edited are recorded, in response to the output of the synchronizing signal generator 5 which generates a synchronizing signal, a disk motor (not shown) is driven with the speed and phase thereof synchronized and the phases of chrominance signals synchronized as well. In association with the operation of the video switcher 7, the optical disk players 1 through 4 are controlled by the PC 8 through the RS-232C interface 9. In response to a video switching command transmitted from the editing controller, the timing generator 10 effects a video switching, in response to frame pulses outputted from the optical disk players 1 through 4, without neither an error in synchronization nor noise in the video switching. Images reproduced by the optical disk players 1 through 4 are displayed on the screen of the monitor 6.

Furthermore, these operation for editing video information on the use of the later-described method and apparatus according to the embodiment of the present invention is described below in detail.

(1) An optical disk respectively duplicated from a video tape of a VCR is respectively mounted in the players 1 through 4.

Figure 1B:
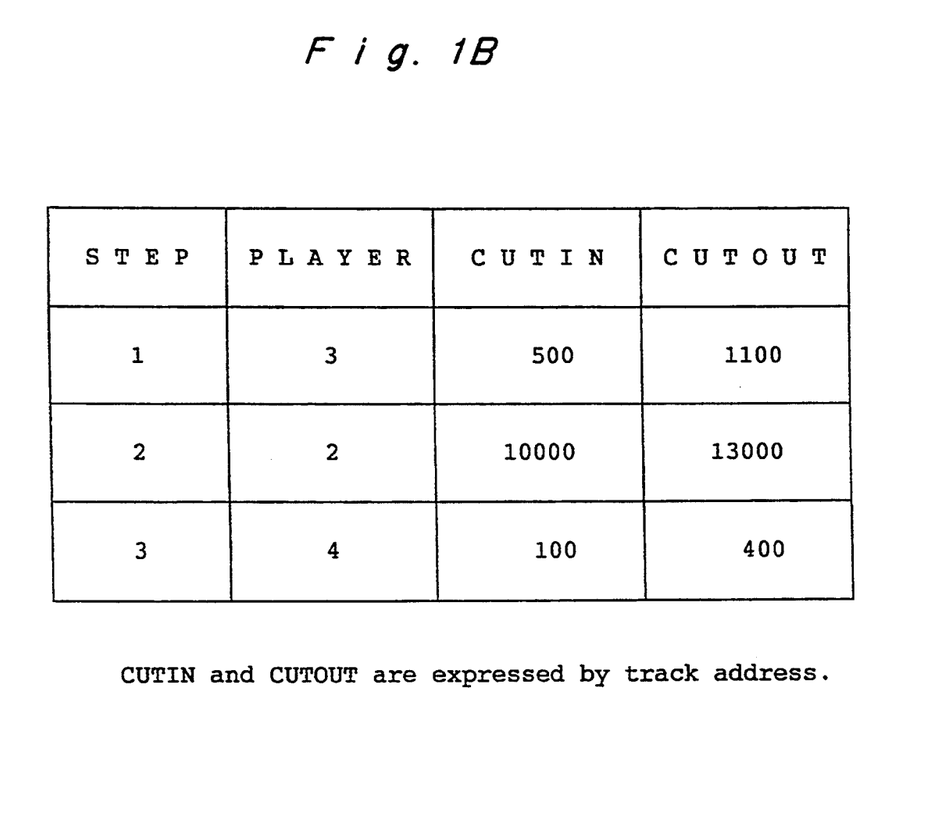
FIG. 1B is a diagram showing an editing procedure used in the system.

(2) An editing procedure shown in FIG. 1B is recorded in an editing list of the PC 8.

(3) According to the editing list, the PC 8 sends an instruction to the RS-232C interface (multiplexer) 9 to select the player 3. At the same time, the PC 8 sends a select information of a video output to the timing generator 10 through a parallel interface. By the timing generator 10, the output of the video switcher 7 is changed from the other player to the player 3 in synchronism with the frame pulse for informing a leading position of an outputted image from the player 3.

(4) The PC 8 retrieves a cutin point (editing IN point) of the optical disk in the selected player 3 and allows the player 3 to reproduce the image in the optical disk until the PC 8 retrieves a cutout point (editing OUT point) thereof.

(5) Then, the PC 8 switches from the player 3 to the player 2 and retrieves a cutin point of the optical disk in the selected player 2 for reproducing.

(6) The player 3 sends a reproduction terminating information to the PC 8 before the image of a cutout point is reproduced. The PC 8 allows the player 2 to start to reproduce after the PC 8 receives the reproduction terminating information from the player 3. At the same time, the PC 8 switches the output of the video switch 7 for the player 2. Thus, these editing operations can be continuously performed in accordance with the editing list.

These editing operations (1) through (6) are repeated and the final track address of the editing list is converted into an address of a video tape to form an editing list for next main editing operation and then a master tape for broadcasting is formed.

According to the embodiment of the present invention, as described later in detail, the editing list in the operation (2) can be expressed by a time code of the video tape and thus it is unnecessary to rewrite the editing list for the next main editing operation in the form of time codes, resulting in improvement of the editing operation efficiency.

Figure 2:
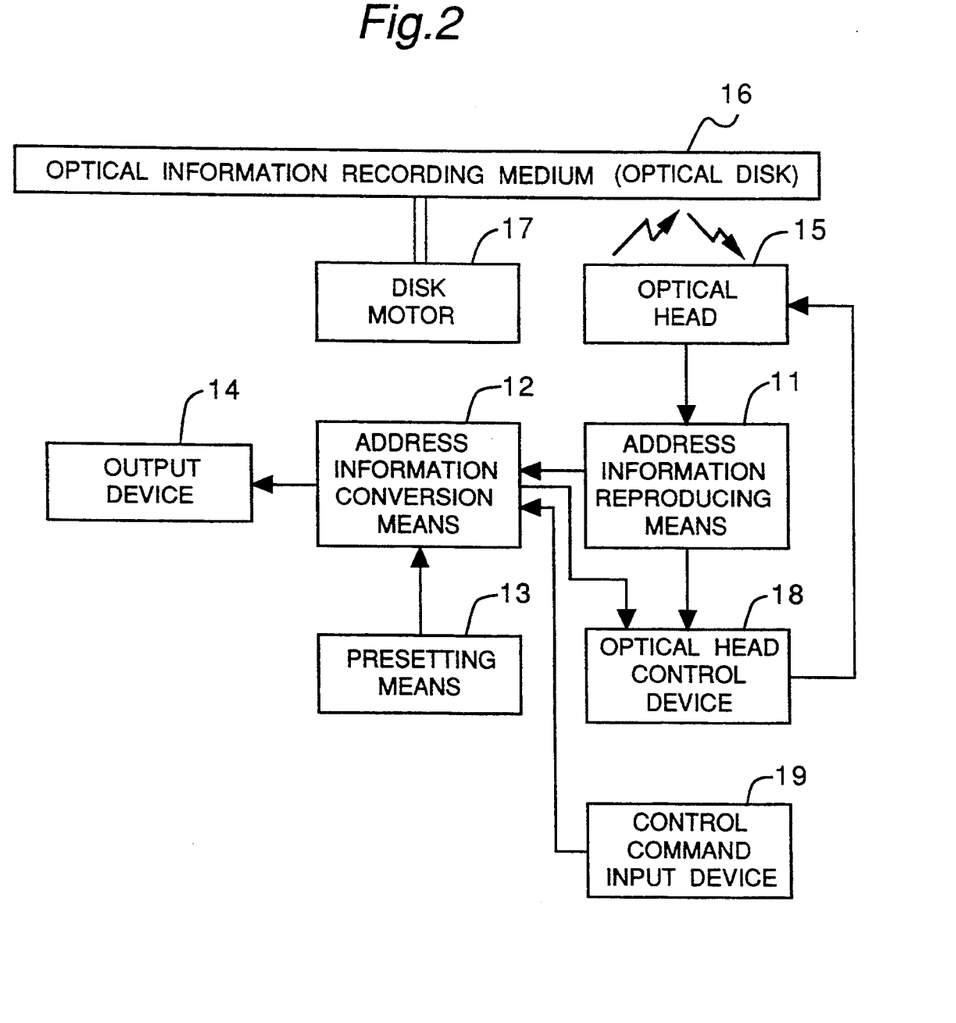
FIG. 2 is a block diagram showing the construction of an optical disk player or recorder.

The construction and operation of the optical disk players 1 through 4 are described below with reference to FIG. 2 showing an example of the construction of the optical disk players 1 through 4 shogun in FIG. 1A.

Figure 3:
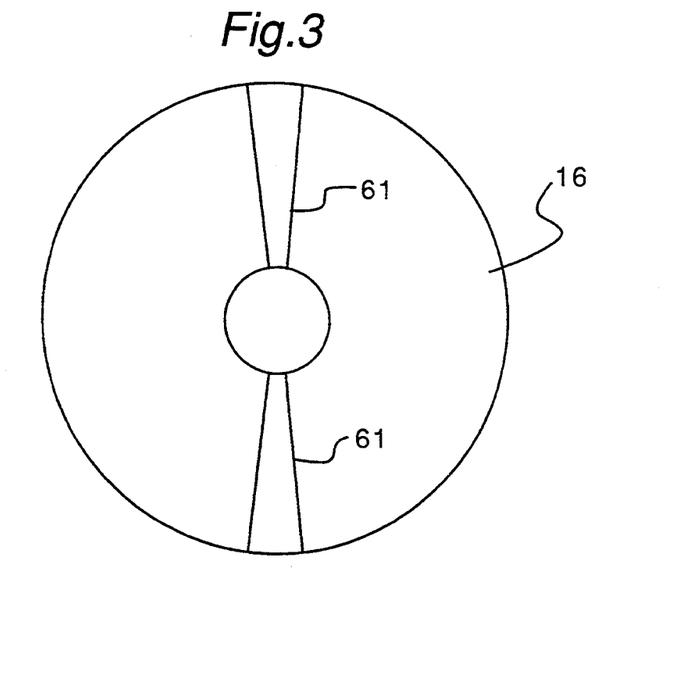
FIG. 3 is a plan view showing the configuration of an optical disk.

Image information is recorded in an optical disk 16 as an optical information recording medium. A code track is formed on the optical disk 16 concentrically or spirally. Track addresses are formed partly on the code track in convex/concave configurations. FIG. 3 shows an area 61 in which track addresses are recorded. A predetermined format, namely, two blocks of phase-encoded signals are recorded on the area 61 per information in getting a master optical disk. One image is recorded per code track. For example, in a disk of 30 cm diameter, "1" track address and "54000" track address are recorded in the innermost periphery track and in the outermost track of a user area, respectively. These track addresses are used as the information for discriminating tracks from each other in retrieving image information.

Referring to FIG. 2, a disk motor 17 drives the optical disk 16. An optical head 15 scans the code track to record, reproduce, and erase information, thus detecting from the optical disk 16 a radio frequency signal (RF signal) containing track address information. The detected RF signal is inputted to an address information reproducing means 11 which reads out a track address. The read-out track address is converted into an image information address by an address information conversion means 12 based on conversion information previously set in a presetting means 13. The image information address is converted in the same time code as that affixed to the image of an original tape and is indicated as a "1 hour 0 minute 0 second 1 frame". The converted image information address is indicated by an output device 14 comprising an LED indicator of 7 segments and 8 digits and an RS-422A interface with communication facility and then transmitted to an external controller, for example, an editing controller.

When an operator sends a control command of a retrieval or a reproduction through the external controller, the control command is sent to the optical disk player via the RS-422A interface in the expression of an image information address, namely, as a time code and then, inputted to a control command input means 19. The control command received by the control command input means 19 is expressed by an image information address and then expressed in a track address by the address information conversion means 12 and then, outputted to an optical head control device 18. The optical head control device 18 has control functions of tracking, focusing, and transporting the optical head 15, and according to a received command, controls the optical head 15 by using the track address reproduced by the address information reproducing means 11 so as to alter a scanning track.

As described above, according to the method, the track address and the image information address are converted into each other in a time-varying image editing operation. Therefore, watching the image information address, the operator can easily perform the editing operation. In order to retrieve image information, an access to the optical disk is made based on the track address. Accordingly, it is possible to perform a random access and thus the editing operation can be accomplished at a high speed.

Referring to FIGS. 4 through 11, the means of the optical disk player shown in FIG. 2 are described in detail below.

Figure 4:
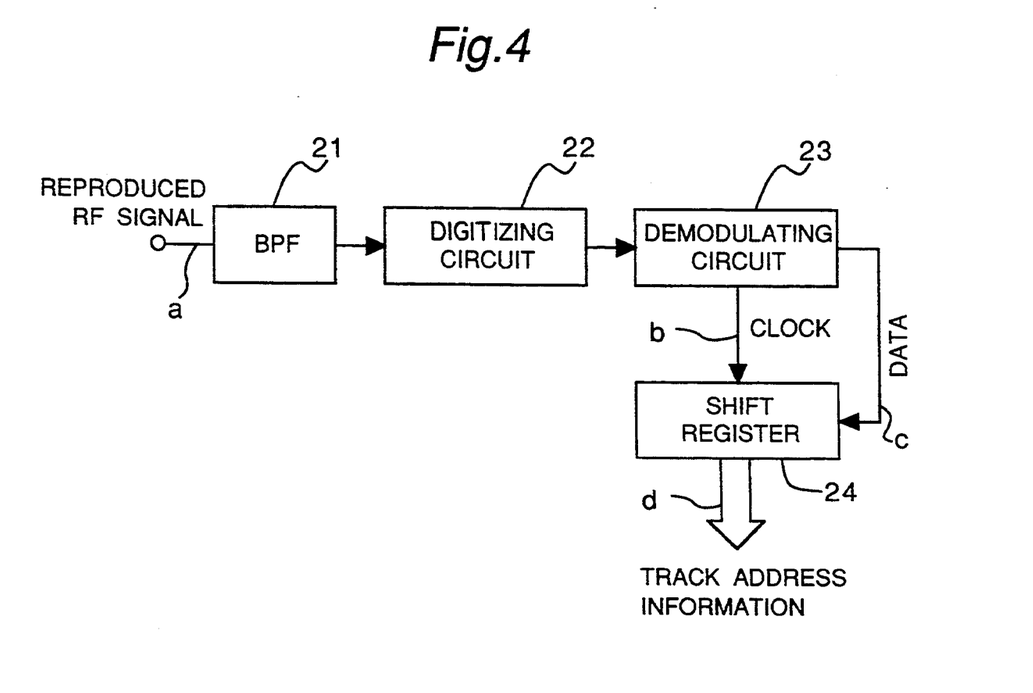
FIG. 4 is a block diagram showing an address information reproducing means.

FIG. 4 shows a block diagram of the construction of the address information reproducing means 11. Track address information is extracted by using a bandpass filter (BPF) 21 from an RF signal (a) reproduced from the optical disk 16 by using the optical head 15 and then, the track address information thus extracted is converted into a digital signal by a digitizing circuit 22. The digitized track address information is demodulated into data (c) and a clock (b) by a demodulating circuit 23. The data (c) and the clock (b) are converted into a parallel signal by a shift register 24 and the track address information (d) is outputted from the shift register 24.

Figure 5:
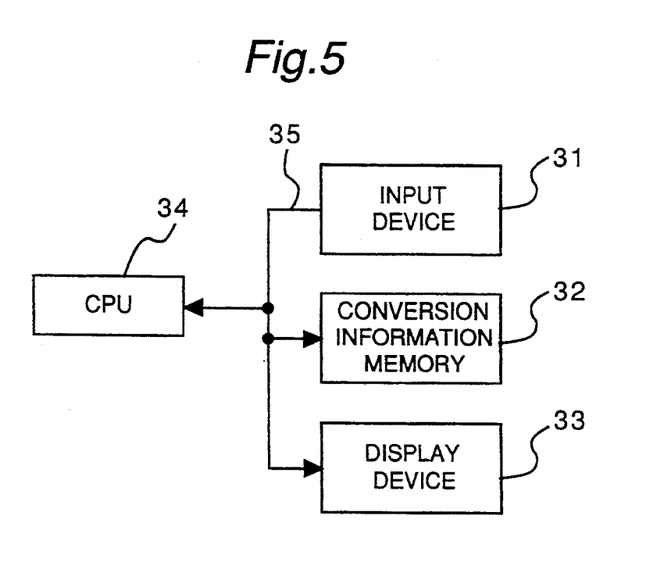
FIG. 5 is a block diagram showing a presetting means.

FIG. 5 shows a block diagram of the construction of the presetting means 13. An input device 31 inputs to a conversion information memory 32 an image information address (called "IN point image information address") and a track address (called "IN point track address") at the start point in recording image information as the information for converting an address. The image information address and the track address are stored at each predetermined memory address of the conversion information memory 32. The method for inputting both addresses to the conversion information memory 32 is described below with reference to FIGS. 6 and 7.

Figure 6:
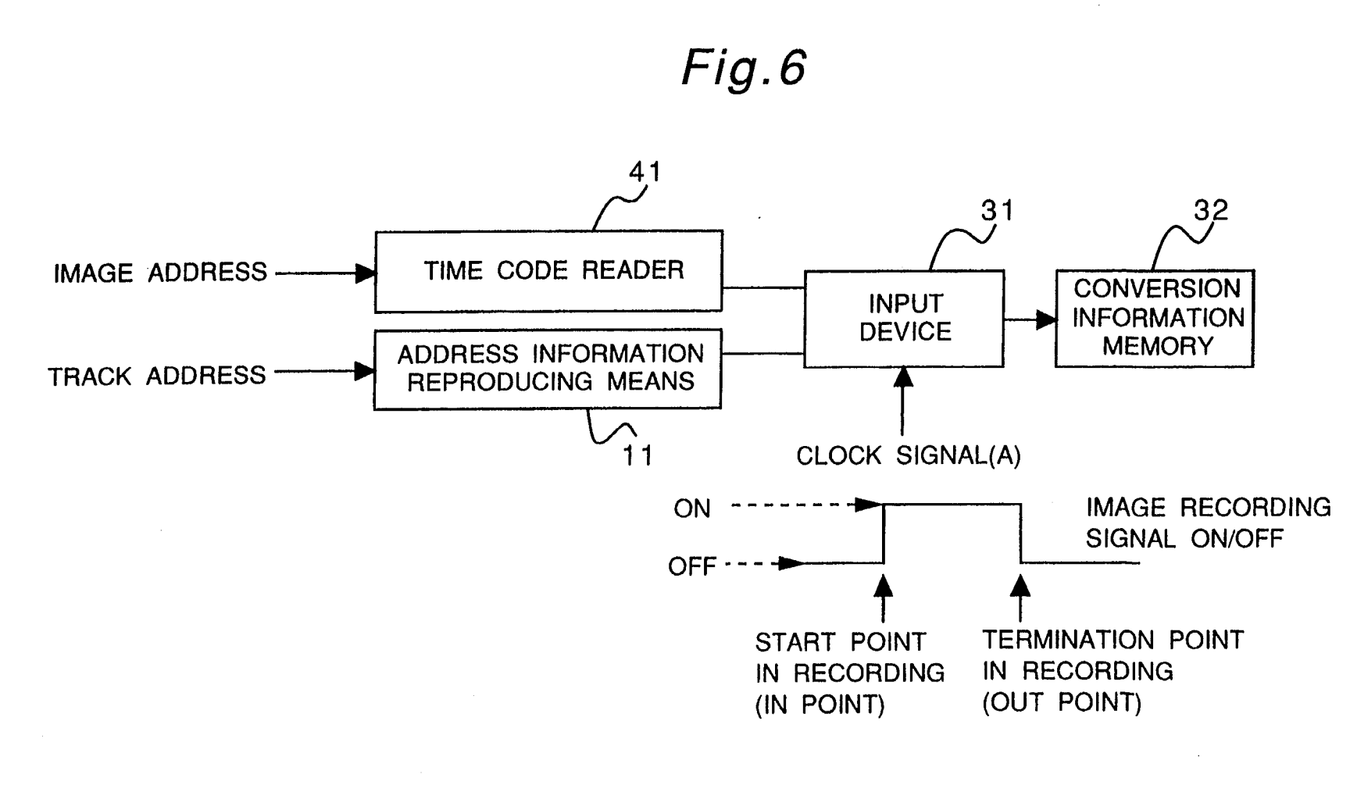
FIGS. 6 and 7 are block diagrams showing a method for setting address conversion information.

FIG. 6 shows a method for, in recording information, automatically inputting address conversion information by using a recording signal when images are recorded from the original tape to the optical disk 16. As shown in FIG. 6, a clock signal (A) is generated in response to ON and OFF of the image recording signal at the start point and the termination point in recording an image from the original tape to the optical disk, and then inputted to the input device 31. A time code reader 41 and the address information reproducing means 11 read out an image information address and a track address, respectively in response to the clock signal (A), thus inputting the address data to the conversion information memory 32.

Figure 7:
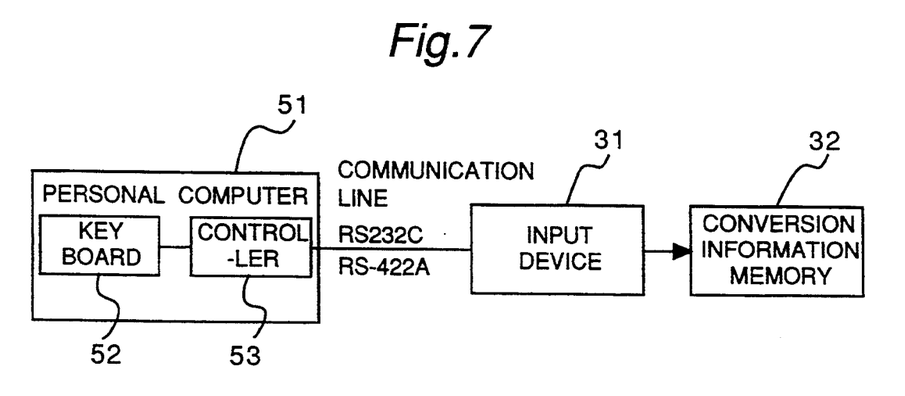

FIG. 7 shows a method for inputting address conversion information by means of a keyboard. A personal computer 51 as shown in FIG. 7 comprises a keyboard 52 and a controller 53. The IN point image information address and the IN point track address inputted by the keyboard 52 are transmitted to the conversion information memory 32 via the input device 31 and stored in the conversion information memory 32. This inputting method causes the operator to take more time and labor than the above-described method for automatically inputting address conversion information. However, the construction of an apparatus for carrying out the method shown in FIG. 7 is simple in its construction and can be manufactured at a lower cost.

Referring to FIG. 5, a numerical value display device 33 comprising the LED of 7 segments displays an inputted address and checks an inputted value. A central processing unit (CPU) 34 of a microcomputer having a read-only memory accommodating a control program accomplishes a series of the above-described operations of the presetting means 13. The CPU 34 is connected with the input means 31, the conversion information memory 32, and the display device 33 via a CPU bus 35 comprising a control line of an address, data, and read-/write.

Figure 8:
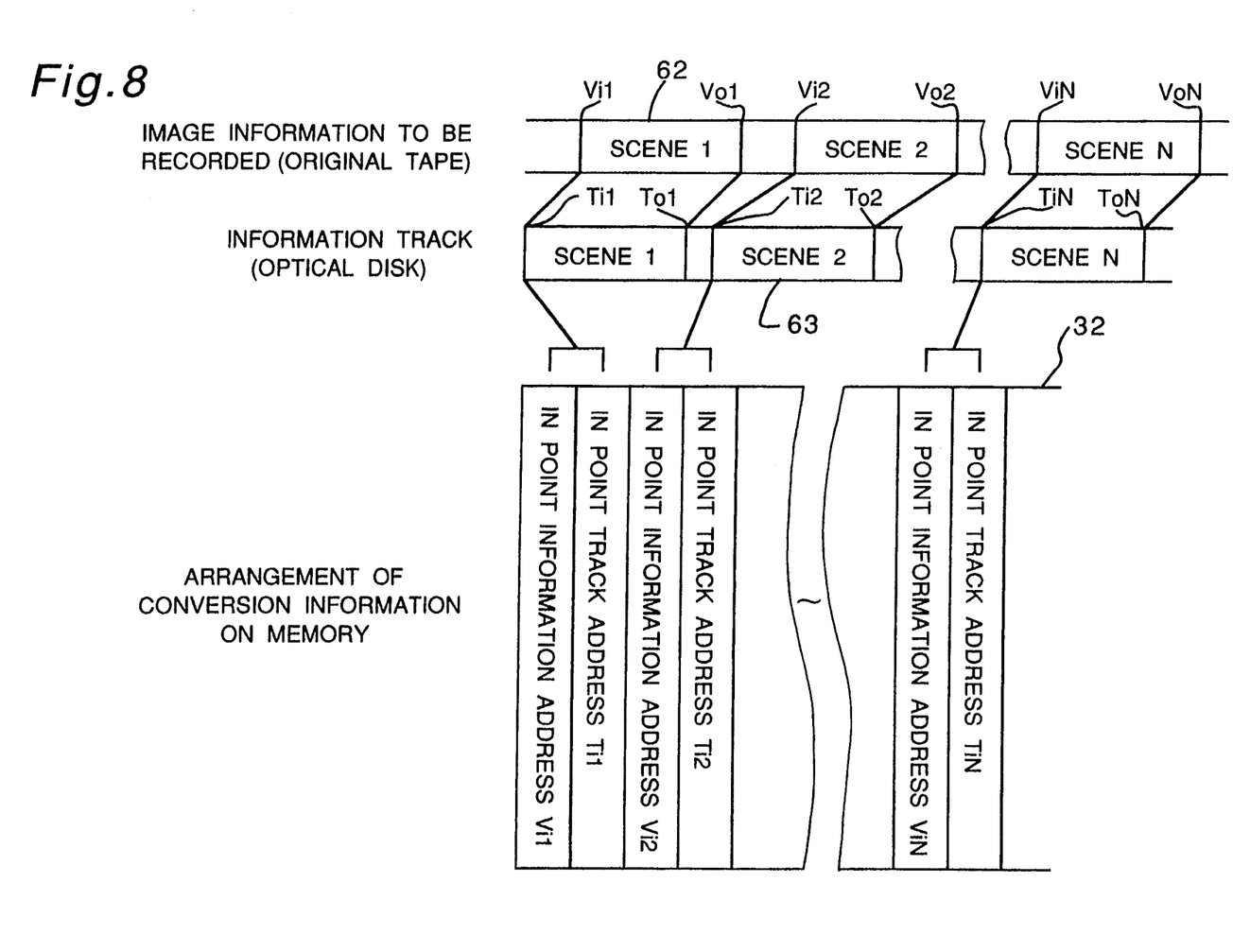
FIG. 8 is a view showing the content of the conversion information memory the presetting means.

FIG. 8 shows an example of conversion information to be used to record some scenes selectively from image information containing a series of address information on the code track of the optical disk. Reference symbol N denotes the number of scenes. A scene (N) is recorded on the original tape 62 in a region from image information addresses ViN to VoN and on the optical disk 63 in a region from track addresses TiN to ToN. Suffix (i) indicates the start point (IN point) in recording information in each scene, and suffix (o) shows the termination point (OUT point) in recording the information. The conversion information memory 32 stores the IN point information address (Vi1–ViN) of the image information recorded on the original tape 62 and the IN point track address (Ti1–TiN) recorded on the optical disk 63 in a pair as the address conversion information between the track address and the image information address. Although not shown in FIG. 8, the addresses of the OUT points can be recorded in the conversion information memory 32 in pairs so that the position of the code track on which an image has not recorded can be detected. In addition, in an area in which an image has not been recorded, an image address is outputted, for example, as "0 hour 0 minute 0 frame" so that it can be clarified that an image has not been recorded in the area. Thus, the handling quality of the original tape 62 can be improved. In editing image information recorded on a plurality of original tapes, the information for discriminating original tapes from each other and the conversion information can be stored in the conversion information memory 32. For example, if five original tapes are used, one of reference numerals 1 through 5 is affixed to each tape. In FIG. 8, though the IN point information address and the IN point track address are recorded in the conversion information memory 32, the OUT point information address and the OUT point track address, or the IN and OUT point information addresses and the IN and OUT point track addresses can be recorded in the conversion information memory 32.

Figure 9A:
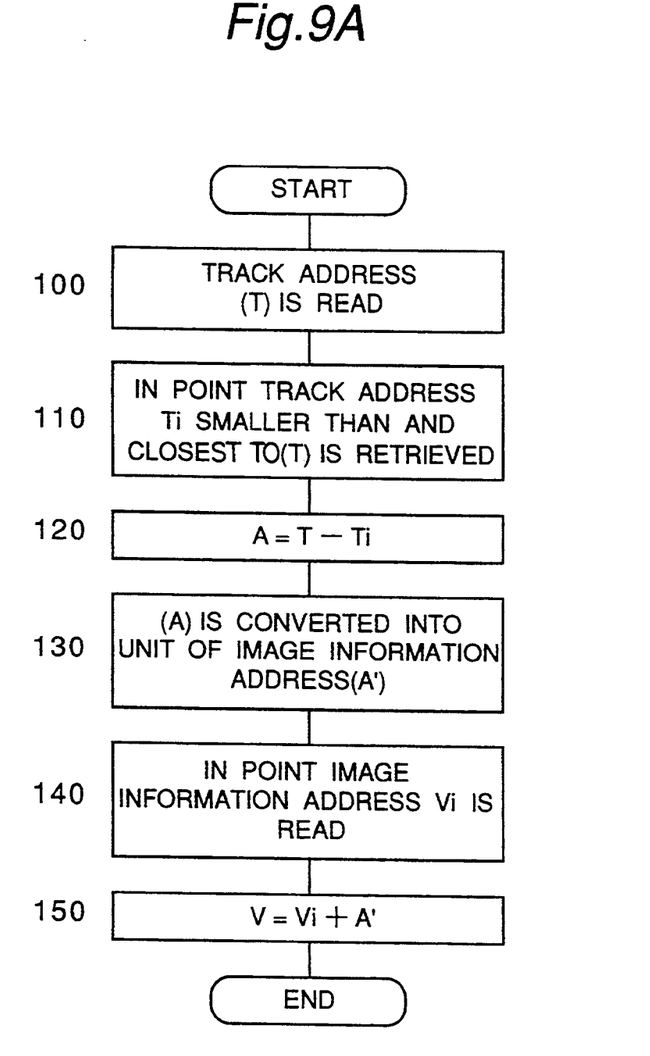
FIGS. 9A and 9B are a flowchart and a block diagram thereof showing program for an address information converting means to execute its operation.
Figure 9B:
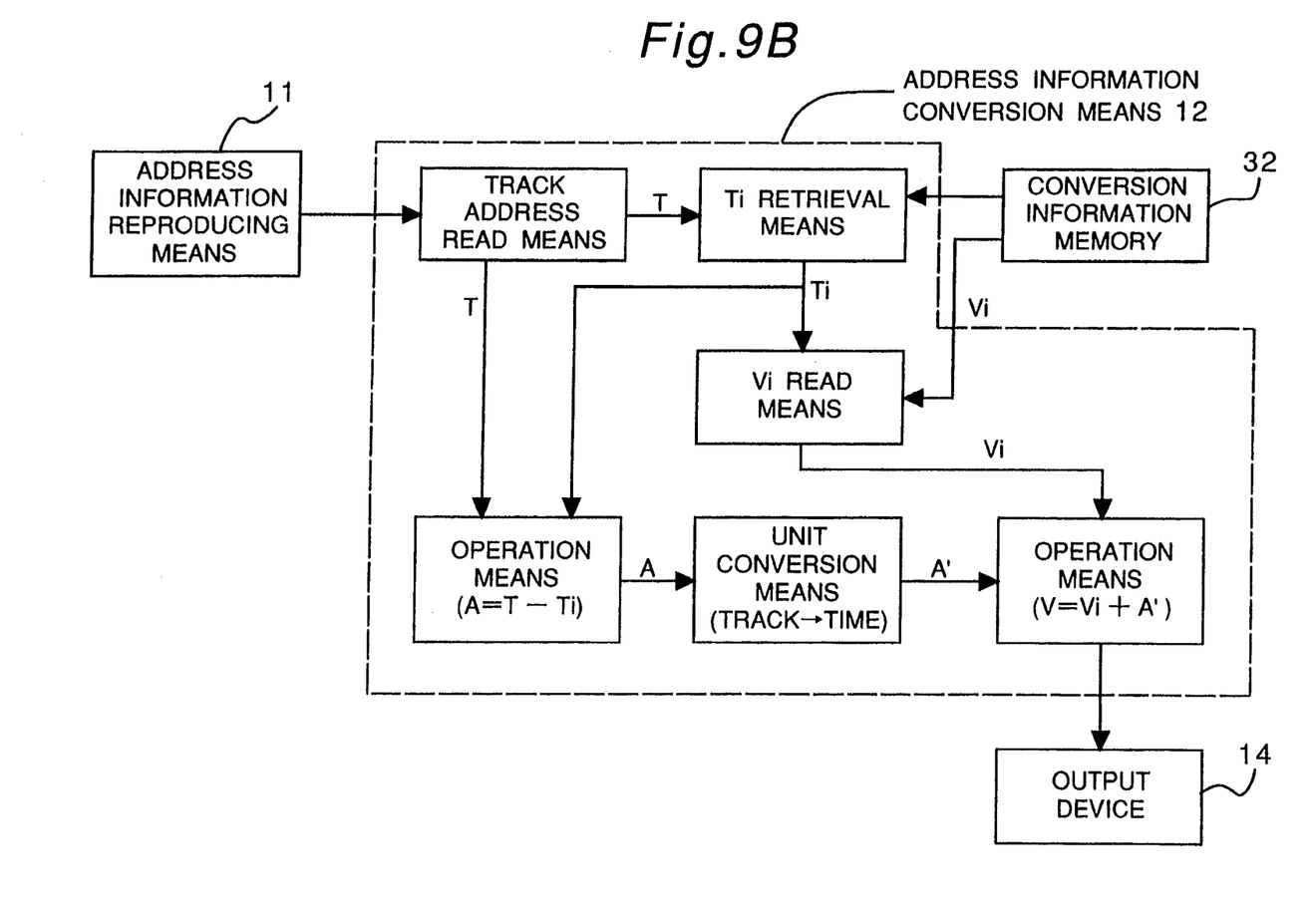
Figure 10A:
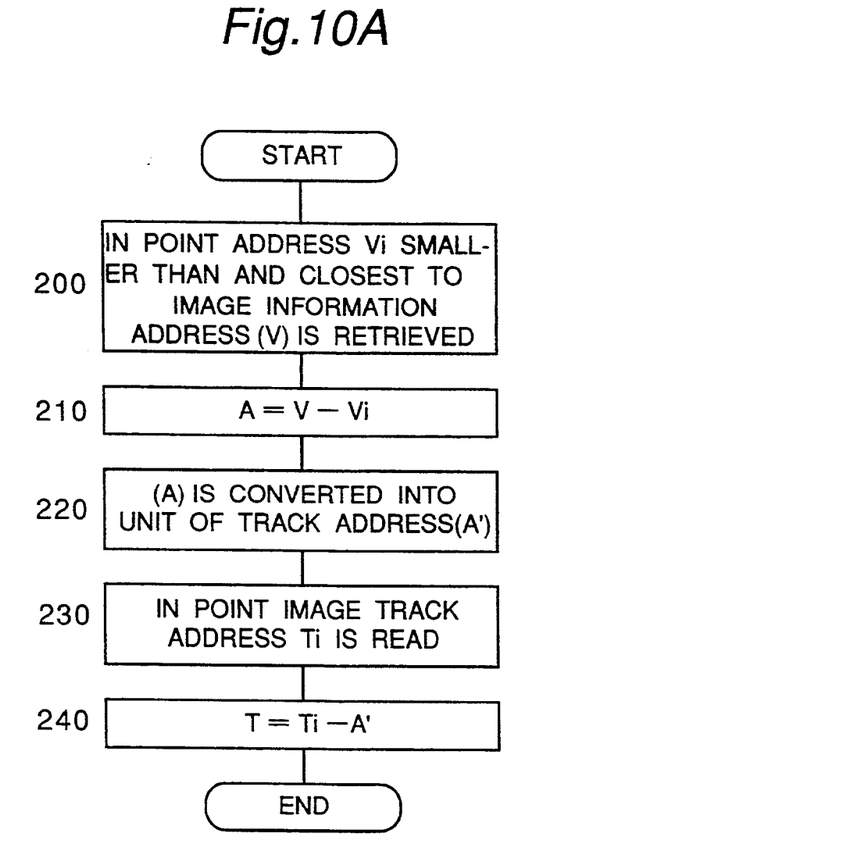
FIGS. 10A and 10B are a flowchart and a block diagram thereof showing a program for an address information converting means to execute its operation.
Figure 10B:
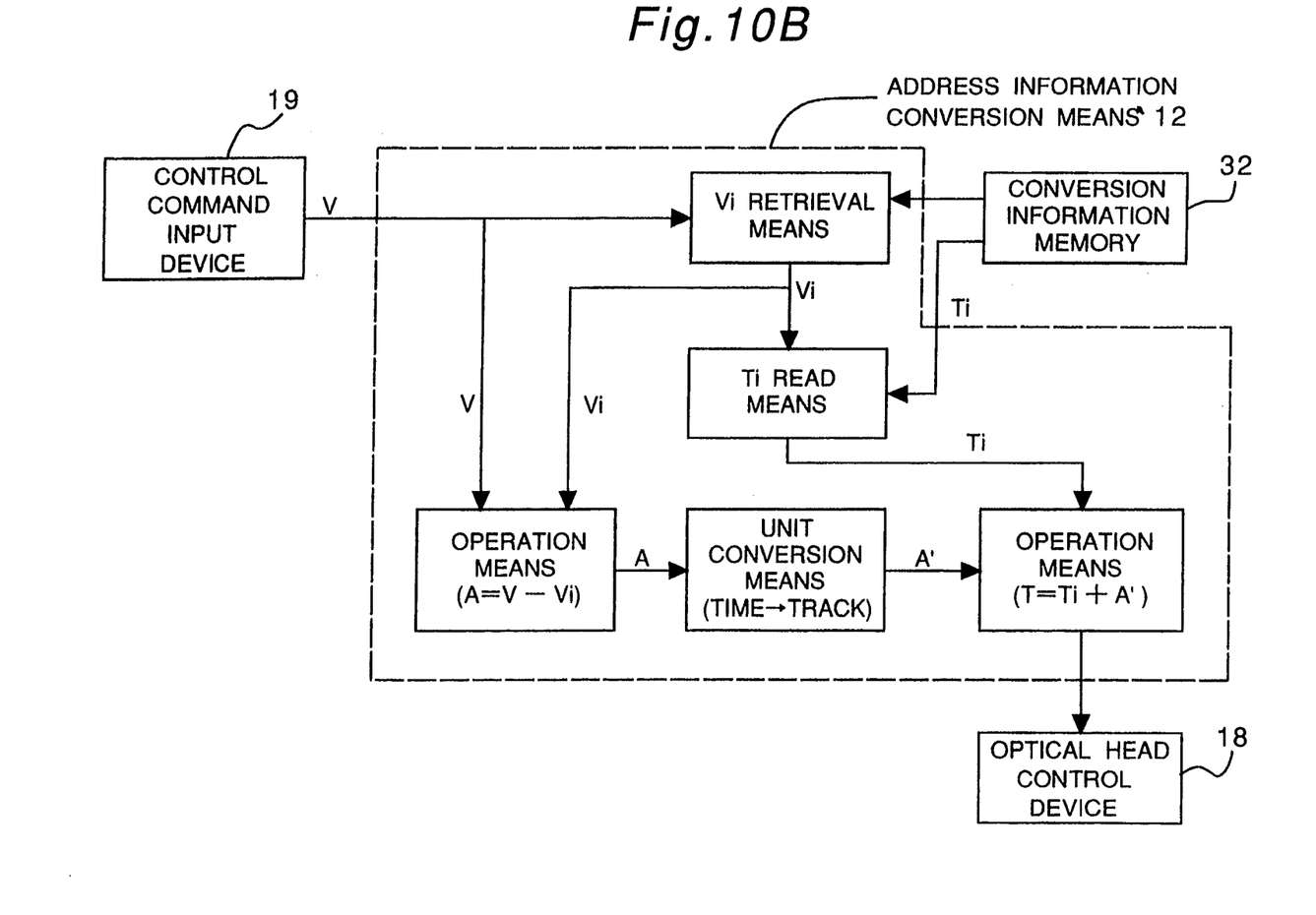

A method for carrying out an address conversion by using the address conversion information is described below. The address information conversion means 12 shown in FIG. 2 comprises a microcomputer accommodating a read-only memory storing a program for achieving an address conversion. FIGS. 9A and 10A show programs for achieving the address conversion and FIGS. 9B and 10B show its block diagram.

FIG. 9A shows a flowchart showing a program for converting a track address into an image information address. At step 100, a track address (T) is read out from the address information reproducing means 11. At step 110, an IN point track address Ti smaller than and closest to the track address (T) is detected based on the conversion information stored in the conversion information memory 32 of the presetting means 13. At step 120, the difference (A) between the track address (T) and the IN point track address Ti is calculated. At step 130, the difference (A) is converted into time unit of the image information address at the rate of 30 tracks/one second.

Since the image information is recorded at the rate of 30 frames/one second based on the NTSC system, the conversion between the track address and the image information address is made at the rate of one frame-/one track. In addition to the program, this rate is stored in the read-only memory of the address information conversion means 12. At step 140, the value of the IN point image information address Vi indicating the address of an image recorded on the IN point track address Ti is read out from the conversion information memory 32. At step 150, the value of the IN point image information address Vi is added to the difference (A') to calculate the image information address (V) so that the track address (T) is converted into the image information address (V).

FIG. 10A is a flowchart showing a program for converting the image information address into the track address. At step 200, the IN point image information address Vi smaller than and closest to the information address (V) is read out from the conversion information stored in the conversion information memory 32 of the presetting means 13. At step 210, the difference (A) between the image information address (V) and the IN point image information address Vi is calculated. At step 220, the difference (A) is converted from the unit of the image information address into the unit of the track address. At step 230, the track address Ti corresponding to the IN point image information address Vi is read out. At step 240, the IN point track address Ti is added to the difference (A') obtained at step 240 to calculate the track address (T) and the image information address (V) is converted into the track address (T). Thus, the optical head control device 18 controls the position of the scanning track of the optical head 15 according to a control command expressed in the track address converted thus.

Figure 11:
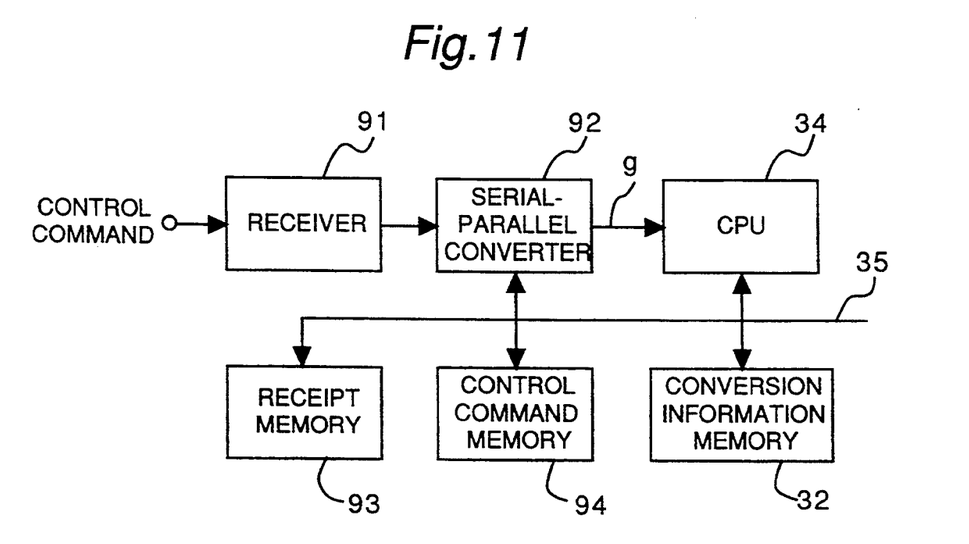
FIG. 11 is a block diagram showing a control instruction inputting means.

FIG. 11 shows the construction of the control command input means 19 shown in FIG. 2. In this embodiment, the control command input means 19 and the address information conversion means 12 have the CPU 34 in common. The operation of the respective means are performed in time series by a program for executing each means accommodated in the read-only memory of the CPU 34. A control command is inputted to a receiver 91 via the serial communication line of the RS-422A and converted into a digital signal of a 5 V system. The digital signal is inputted to a serial-parallel converter 92. Upon input of communication data of one unit, an interruption signal (g) is outputted from the serial-parallel converter 92 to the CPU 34. Upon detection of the interruption signal (g), the CPU 34 reads out the communication data from the serial-parallel converter 92 and a receiving memory 93 stores the communication data according to the receipt order of the communication data. Upon receipt of data indicating the communication termination of the control command, using the image information address conversion program as shown in FIG. 10A, the CPU 34 converts the control command represented in the form of an image information address in the receiving memory 93 into the control command expressed in the form of a track address according to conversion information stored in the conversion information memory 32, and a control command memory 94 stores the control command converted into the track address. The control command stored in the control command memory 94 is used by the optical head control device 18 as the control command of the optical head 15.

Figure 12:
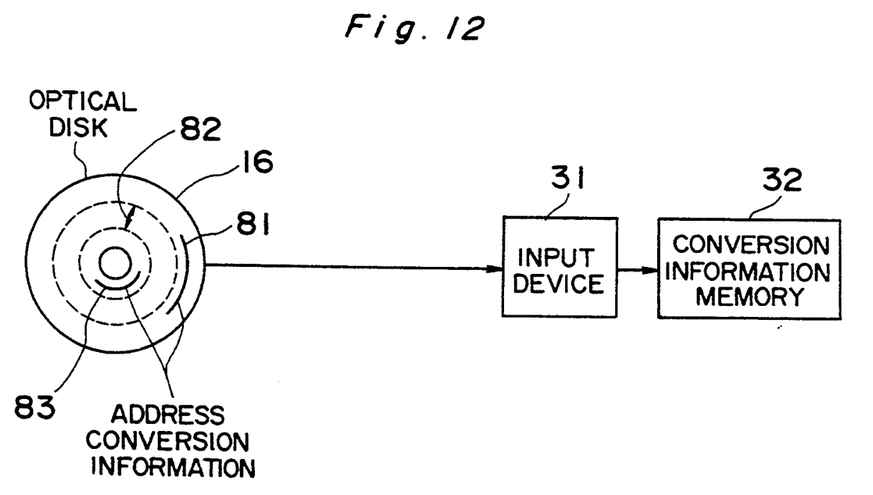
FIG. 12 is a block diagram showing a method for inputting address conversion information.

In the above-described embodiment, address conversion information obtained by the presetting means 13 is stored in the conversion information memory 32. Instead, the address conversion information 85 can be recorded in an area of the optical disk 16 other than the image recording area 82 thereof, namely, in an inner periphery 83 or an outer periphery 81 thereof as shown in FIG. 12. Thus, the recorded information is read by the input device 31 in reproducing an image. Then, the data thus read is stored in the conversion information memory 32 so as to make an address conversion. The converted information can be stored in the conversion information memory 32 even though the optical disk 16 is exchanged with a different one. Thus, the operational performance of an image reproducing and recording operation such as an editing operation can be improved.

Figure 13:
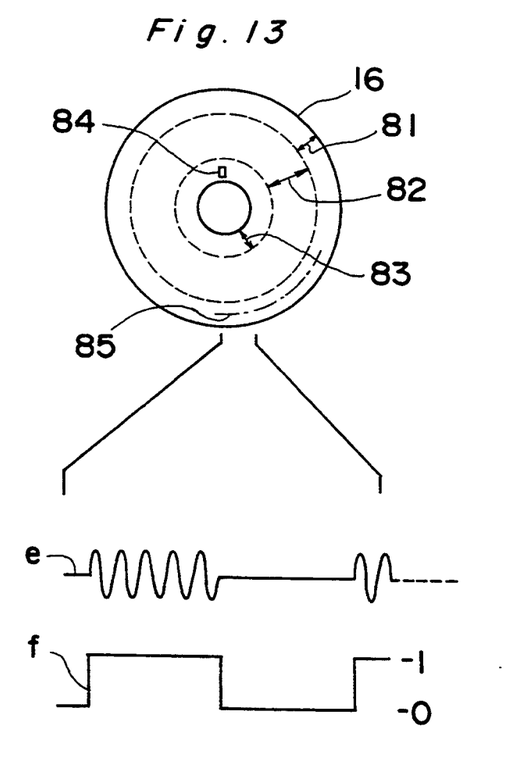
FIG. 13 is a view showing the position on the optical disk at which the address conversion information is recorded.

FIG. 13 shows a method for recording address conversion information on the optical disk 16. As described above, the address conversion information 85 is recorded in the inner periphery 83 or the outer periphery 81 of the optical disk 16 other than the image recording area 82 thereof. The recording timing and the reproducing timing are determined based on a reference mark 84 of the rotation of the disk 16. The address conversion information 85 is recorded on the optical disk in the form of recording/unrecording of image information by using the function of recording image information and reproduced in the form of an RF signal of a waveform as shown by (e) of FIG. 13. The RF signal (e) is converted into a digitizing signal (f) by a circuit comprising an envelope and frequency/voltage conversion for detecting the drop-out of a signal and read thereby. The information thus read is stored in the conversion information memory 32 of the presetting means 13.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for recording a time-varying image having a time code comprising position information of the image in an optical information recording medium having an address of a code track corresponding to the image, and for reproducing the image therefrom, comprising:
   a memory means for additionally storing data of a changing relationship between the time code of the image and the address of the code track of the optical information recording medium each time image information is stored;
   an input means for inputting the address of the time code in correspondence with the image to be recorded or reproduced;
   an address information conversion means for converting the inputted address of the time code into the address of the code track based on the data stored in the memory means; and
   an access means for accessing the optical information recording medium based on the address of the code track obtained by the conversion means to record or reproduce the image in correspondence with the inputted address of the time code.

2. The apparatus as claimed in claim 1, wherein the conversion means converts the address of the code track into the address of the time code.

3. The apparatus as claimed in claim 1, wherein when the image is recorded in the optical information recording medium, the memory means stores the data of the relationship between the addresses of the time code and the code track.

4. The apparatus as claimed in claim 1, wherein the input means has a keyboard for inputting the address of the time code and the address of the code track corresponding to the address of the time code by pressing a key thereon so that the data of the relationship between the addresses of the code track and the time code is stored in the memory means.

5. The apparatus as claimed in claim 1, wherein the memory means is provided on the medium.

6. The apparatus as claimed in claim 5, wherein an area of the optical information recording medium where the data of the relationship is recorded is an area of the optical information recording medium except for an area of the optical information recording medium where the image is recorded.

7. The apparatus as claimed in claim 1, further comprising an output means for outputting an address of the time code in correspondence with the image recorded or reproduced by the access means.

8. The apparatus as claimed in claim 1, wherein the memory means stores data of the relationship between a recording start address of the code track and a recording start address of the time code corresponding to the recording start address of the code track.

9. The apparatus as claimed in claim 1, wherein the memory means stores data of the relationship between a recording end address of the code track and a recording end address of the time code corresponding to the recording end address of the code track.

10. The apparatus as claimed in claim 1, wherein the memory means stores data of the relationship between a recording start address and a recording end address of the code track and a recording start address and a recording end address of the time code respectively corresponding to the recording start address and the recording end address of the code track.

11. The apparatus as claimed in claim 10, wherein the memory means stores a time-varying image source identification code of the image to be recorded in the optical information recording medium when the memory means stores the data of the relationship between the addresses of the code track and the time code corresponding to the address of the code track.

12. The apparatus as claimed in claim 10, further comprising a finding means for finding an area of the optical information record medium where no image is recorded based on the recording end address of the code track.

13. An apparatus for recording a time-varying image having a time code comprising position information of the image in an optical information recording medium having an address of a code track corresponding to the image, comprising:
   a memory means for additionally storing data of a changing relationship between the time code of the image and the address of the code track of the optical information recording medium each time image information is stored;

an input means for inputting the address of the time code in correspondence with the image to be recorded;

an address information conversion means for converting the inputted address of the time code into the address of the code track based on the data stored in the memory means; and an access means for accessing to the optical information recording medium based on the address of the code track obtained by the conversion means to record the image in correspondence with the inputted address of the time code.

14. An apparatus for reproducing a time-varying image having a time code comprising position information of the image recorded in an optical information recording medium having an address of a code track corresponding to the image, comprising:

a memory means for additionally storing data of a changing relationship between the time code of the image and the address of the code track of the optical information recording medium each time image information is stored;

an input means for inputting the address of the time code in correspondence with the image to be reproduced;

an address information conversion means for converting the inputted address of the time code into the address of the code track based on the data stored in the memory means; and an access means for accessing the optical information recording medium based on the address of the code track obtained by the conversion means to reproduce the image in correspondence with the inputted address of the time code.

15. A method for recording a time-varying image having a time code comprising position information of the image in an optical information recording medium having an address of a code track corresponding to the image and reproducing the image therefrom, comprising the steps of:

additionally storing data of a changing relationship between the time code of the image and the address of the code track of the optical information recording medium;

inputting the address of the time code in correspondence with the image to be recorded or reproduced;

converting the inputted address of the time code into the address of the code track based on the data stored in the storing step; and accessing to the optical information recording medium based on the address of the code track obtained by the converting step to record or reproduce the image in correspondence with the inputted address of the time code.

16. The method as claimed in claim 15, wherein the converting step comprises the steps of:

reading the address of the time code;

finding a recording start address of the time code which is smaller than and closest to the read address of the time code;

subtracting the recording start address from the read address of the time code to obtain a value;

converting the value obtained in the subtracting step into a value in the code track;

reading a recording start address of the code track; and adding the read recording start address of the code track to the value in the code track obtained in the converting step.

17. The method as claimed in claim 15, wherein the converting step comprises the steps of:

reading the address of the code track;

finding a recording start address of the code track which is smaller than and closest to the read address of the code track;

subtracting the recording start address from the read address of the code track to obtain a value;

converting the value obtained in the subtracting step into a value in the time code;

reading a recording start address of the time code; and adding the read recording start address of the time code to the value in the time code obtained in the converting step.

18. A method for recording a time-varying image having a time code comprising position information of the image in an optical information recording medium having an address of a code track corresponding to the image, comprising the steps of:

additionally storing data of a changing relationship between the time code of the image and the address of the code track of the optical information recording medium;

inputting the address of the time code in correspondence with the image to be recorded;

converting the inputted address of the time code into the address of the code track based on the data stored in the storing step; and accessing the optical information recording medium based on the address of the code track obtained by the converting step to record the image in correspondence with the inputted address of the time code.

19. A method for reproducing a time-varying image having a time code comprising position information of the image recorded in an optical information recording medium having an address of a code track corresponding to the image, comprising the steps of:

additionally storing data of a changing relationship between the time code of the image and the address of the code track of the optical information recording medium;

inputting the address of the time code in correspondence with the image to be reproduced;

converting the inputted address of the time code to the address of the code track based on the data stored in the storing step; and accessing the optical information recording medium based on the address of the code track obtained by the converting step to reproduce the image in correspondence with the inputted address of the time code.

* * * * *